United States Patent
Hyodo et al.

[11] Patent Number: 5,431,144
[45] Date of Patent: Jul. 11, 1995

[54] EVAPORATED FUEL CONTROL APPARATUS

[75] Inventors: Yoshihiko Hyodo, Susono; Takaaki Itou, Mishima; Akinori Osanai, Susono; Toru Kidokoro, Hadano, all of Japan

[73] Assignee: Toyota Jidosha Kabushiki Kaisha, Toyota, Japan

[21] Appl. No.: 111,345

[22] Filed: Aug. 24, 1993

[30] Foreign Application Priority Data

Aug. 28, 1992 [JP] Japan .................. 4-229706

[51] Int. Cl.$^6$ ............................ F02M 37/04
[52] U.S. Cl. ...................... 123/520; 123/541
[58] Field of Search ........... 123/516, 541, 520, 519, 123/518, 521

[56] References Cited

U.S. PATENT DOCUMENTS

| | | | |
|---|---|---|---|
| 3,844,264 | 10/1974 | Grainger | 123/518 |
| 4,003,358 | 1/1977 | Tatsutomi | 123/518 |
| 4,024,848 | 5/1977 | Lee | 123/516 |
| 4,450,820 | 5/1984 | Haynes | 123/516 |
| 4,811,718 | 3/1989 | Sonoda | 123/516 |
| 4,815,436 | 3/1989 | Sasaki | 123/520 |
| 4,829,968 | 5/1989 | Onufer | 123/520 |
| 5,021,071 | 6/1991 | Reddy | 123/518 |
| 5,056,494 | 5/1991 | Kayanuma | 123/519 |
| 5,335,638 | 8/1994 | Mukai | 123/520 |

FOREIGN PATENT DOCUMENTS

| | | | |
|---|---|---|---|
| 0058143 | 4/1984 | Japan | 123/520 |
| 60-153463 | 7/1985 | Japan . | |
| 61-25567 | 11/1986 | Japan . | |
| 2-139353 | 10/1990 | Japan . | |

*Primary Examiner*—Carl S. Miller
*Attorney, Agent, or Firm*—Kenyon & Kenyon

[57] ABSTRACT

An evaporated fuel control apparatus includes a fuel tank for storing fuel, a first passage for connecting an internal space of the fuel tank to the atmosphere, the first passage having an opening which is open to the atmosphere, and a fuel vapor separating unit provided in the first passage for separating evaporated fuel of the fuel tank from air fed from the fuel tank to the atmosphere via the fuel vapor separating unit, the fuel vapor separating unit permitting passage of molecular components of air and not permitting passage of molecular components of fuel.

7 Claims, 8 Drawing Sheets

DROP OF FUEL

EVAPORATED FUEL CONTROL APPARATUS

BACKGROUND OF THE INVENTION

(1) Field of the Invention

The present invention generally relates to an evaporated fuel control apparatus, and more particularly to an apparatus for preventing evaporated fuel of a fuel tank of an automotive vehicle from escaping to the atmosphere even when the vehicle stays at a high temperature for an extended period.

(2) Description of the Related Art

Japanese Laid-Open Patent Publication No. 60-153463 discloses an evaporated fuel control device in which a fuel tank is connected to a canister having an opening that is open to the atmosphere, so that the fuel tank communicates with the atmosphere via the opening of the canister. When the temperature of fuel within the fuel tank becomes higher, a certain amount of fuel is evaporated and the internal pressure of the fuel tank is increased. As a certain amount of air is fed from the fuel tank into the atmosphere via the opening of the canister due to the increased pressure of the fuel tank, the internal pressure of the fuel tank can be maintained at a constant level. As the canister provided between the fuel tank and an intake passage of the engine contains an absorbent for absorbing evaporated fuel, the evaporated fuel supplied from the fuel tank is absorbed by the canister, thus preventing the evaporated fuel of the fuel tank from escaping to the atmosphere.

However, when the vehicle is exposed to hot weather for a long period, for example while parked, the temperature of fuel within the fuel tank becomes very high, and an increasing amount of fuel in the fuel tank is actively evaporated. In order to capture all the evaporated fuel supplied from the fuel tank, it is necessary to utilize a canister capable of storing a very large amount of evaporated fuel. However, the mounting space for mounting parts on an automotive vehicle is limited, and it is difficult to mount a large-capacity canister on the automotive vehicle.

SUMMARY OF THE INVENTION

Accordingly, it is a general object of the present invention to provide a novel and useful evaporated fuel control apparatus in which the above described problems are eliminated.

Another, more specific object of the present invention is to provide an evaporated fuel control apparatus which can safely and stably prevent evaporated fuel of a fuel tank of an automotive vehicle from escaping to the atmosphere when the vehicle is under high temperature conditions for an extended period.

Still another object of the present invention is to provide an evaporated fuel control apparatus which has a smaller size and requires less mounting space for mounting the apparatus on the vehicle than a currently used evaporated fuel control apparatus.

The above mentioned objects of the present invention can be achieved by an evaporated fuel control apparatus which includes a fuel tank for storing fuel, a first passage for connecting an internal space of the fuel tank to the atmosphere, the first passage having an opening which is open to the atmosphere, and a fuel vapor separating unit provided in the first passage for separating evaporated fuel of the fuel tank from air fed from the fuel tank to the atmosphere via the fuel vapor separating unit, the fuel vapor separating unit permitting passage of molecular components of air and not permitting passage of molecular components of fuel.

The fuel vapor separating unit according to the present invention permits the passage of molecular components of air from the fuel tank to the atmosphere in order to adjust the internal pressure of the fuel tank. It is possible for the evaporated fuel control apparatus of the present invention to safely and stably prevent the evaporated fuel of the fuel tank from escaping to the atmosphere when the vehicle is under high temperature conditions for an extended period. According to the present invention, the capacity of the canister is reduced, and the evaporated fuel control apparatus has a smaller size and requires less mounting space for mounting the apparatus on the vehicle than a currently used evaporated fuel control apparatus. In addition, it is possible for the present invention to prevent the fuel vapor separating unit from being clogged with liquefied fuel or foreign matter.

BRIEF DESCRIPTION OF THE DRAWINGS

The above and other objects, features and advantages of the present invention will become apparent from the following detailed description when read in conjunction with the accompanying drawings in which.

DESCRIPTION OF THE PREFERRED EMBODIMENTS

A description will now be given of a first embodiment of the present invention with reference to FIGS. 1 and 2.

Figure 1:
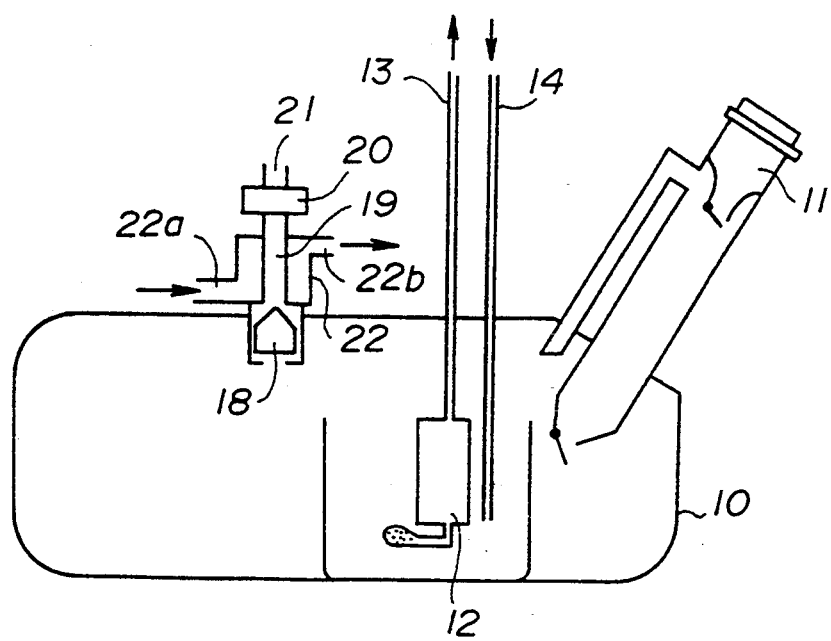
FIG. 1 is a sectional view showing a first embodiment of the evaporated fuel control apparatus according to the present invention.
Figure 2:
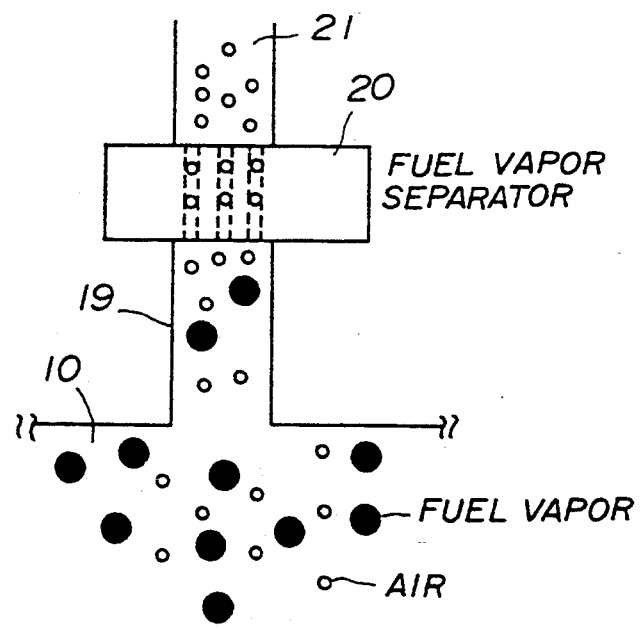
FIG. 2 is a diagram showing a fuel vapor separator of the evaporated fuel control apparatus shown in FIG. 1.

FIG. 1 shows an evaporated fuel control apparatus provided by the first embodiment of the present invention. In FIG. 1, there are shown a fuel tank 10, a fuel filler neck 11, a fuel feeding pump 12, a fuel pipe 13, and a fuel return pipe 14. These parts are mounted on an automotive vehicle. A roll-over valve 18 is mounted at an upper portion of the fuel tank 10. The roll-over valve 18 functions to close an upper space of the fuel tank 10 to prevent the leakage of fuel of the fuel tank 10 when the vehicle is rolled over. A vapor passage 19 is connected to the fuel tank 10 through the roll-over valve 18. At an intermediate portion of the vapor passage 19, a fuel vapor separator 20 is provided. An end portion of the vapor passage 19, opposite to the fuel tank 10, is formed as an opening 21 which is open to the atmosphere. A vapor cooling unit 22 is mounted on the vapor passage 19, and fuel vapor in the vapor passage 19 is cooled with external air passing the vapor cooling unit 22.

The fuel vapor separator 20 is filled with porous material having pores, such as zeolite. The diameter of pores of the porous material is approximately 3.5 to 4 angstroms. Thus, the fuel vapor separator 20 permits the passage of molecular components of air such as oxygen molecules, nitrogen molecules and vaporized water molecules whose diameter is approximately 3 angstroms or less, and it does not permit the passage of molecular components of fuel vapor such as gasoline molecules whose diameter is greater than 4 angstroms.

The vapor cooling unit 22 is provided with an air passage having an air inlet 22a and an air outlet 22b. External cooled air supplied from an air conditioner of the vehicle enters the vapor cooling unit 22 from the air inlet 22a, so that fuel vapor in the vapor passage 19 is cooled with the supplied air to a lower temperature. The air passing to the outside of the vapor cooling unit 22 from the air outlet 22b is exhausted to the inside of the vehicle or to the atmosphere.

As the ambient temperature of the vehicle becomes higher in the day than in the night, the temperature of fuel within the fuel tank 10 changes to a higher temperature. The fuel within the fuel tank 10 is evaporated at an increasing rate and the amount of fuel vapor is increased with the increase of the fuel temperature, so that the internal pressure of the fuel tank 10 is increased to a higher pressure. As the internal pressure of the fuel tank 10 becomes higher, molecules of air in the fuel tank 10 pass through the pores of the fuel vapor separator 20, and the air passing to the outside of the vapor passage 19 from the opening 21 is discharged to the atmosphere as shown in FIG. 2. The internal pressure of the fuel tank 10 at this time is in equilibrium with the atmospheric pressure. In FIG. 2, the molecules of air are indicated by hollow dots and the molecules of fuel vapor are indicated by black dots.

As the ambient temperature becomes lower in the night than in the day, the temperature of fuel within the fuel tank 10 changes to a lower temperature. The amount of fuel vapor in the fuel tank 10 is decreased, and the internal pressure of the fuel tank 10 becomes lower than the atmospheric pressure. A certain amount of air enters the fuel tank 10 through the fuel vapor separator 20 in the vapor passage 19 due to such a negative pressure in the fuel tank 10. As a result, the internal pressure of the fuel tank 10 is in equilibrium with the atmospheric pressure. The fuel vapor separator 20 at this time prevents the fuel tank 10 from being subjected to an excessive negative pressure.

Next, the function of the fuel vapor separator in the evaporated fuel control apparatus will be described with reference to FIGS. 3A and 3B.

When an internal combustion engine of the vehicle is operating, a certain amount of fuel, heated in the vicinity of the engine, is returned to the fuel tank 10 through the fuel return pipe 14, and the temperature of the fuel within the fuel tank 10 changes to a higher temperature. Especially when the engine has been operated at a high ambient temperature for a long time, it is likely that the fuel temperature is increased to the boiling point so that the saturation pressure of fuel vapor at the temperature (the boiling point) becomes higher than the atmospheric pressure.

Figure 3A:
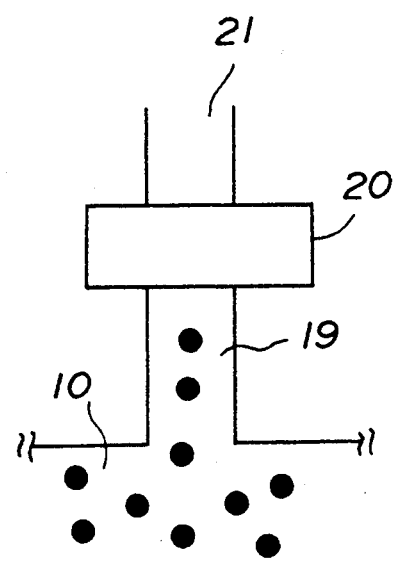
FIGS. 3A and 3B are diagrams for explaining the function of the fuel vapor separator.
Figure 3B:
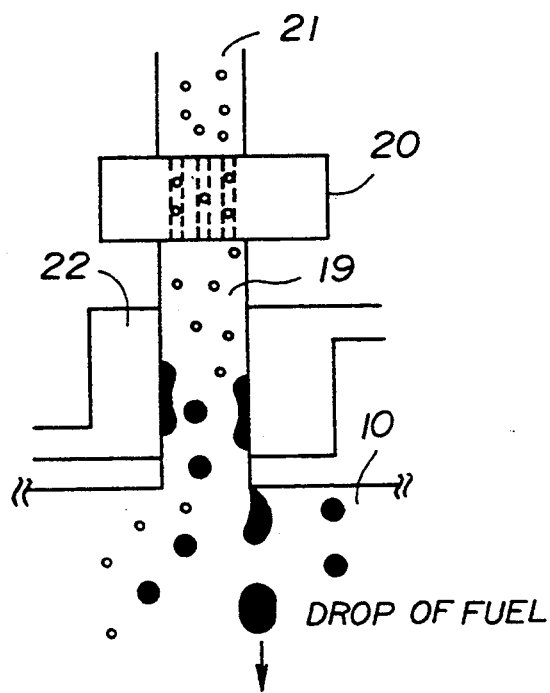

FIG. 3A shows an internal condition of the fuel tank 10 when the saturation pressure of fuel vapor in the fuel tank 10 is higher than the atmospheric pressure. The internal pressure of the fuel tank 10 is high, and there are almost no molecular components of air in the fuel tank 10. In order to decrease the internal pressure of the fuel tank 10, air cannot be discharged from the fuel tank 10.

Under the condition shown in FIG. 3A, the fuel vapor in the vapor passage 19 is cooled with external cooled air passing the vapor cooling unit 22. A certain amount of fuel vapor in the vapor passage 19 is liquefied due to the cooling function of the vapor cooling unit 20, and it is returned to the fuel tank 10 as shown in FIG. 3B. The fuel temperature at this time is no longer increased, and it is possible to prevent the saturation pressure of fuel vapor from being higher than the atmospheric pressure. Thus, it is possible to prevent the fuel tank 10 from being subjected to an excessively high pressure.

In the first embodiment described above, the fuel vapor separator 20 permits the passage of molecular components of air from the fuel tank to the atmosphere, thereby preventing evaporated fuel of the fuel tank from escaping to the atmosphere. The vapor cooling unit 22 is mounted on the vapor passage 19 between the fuel tank 10 and the fuel vapor separator 20, thereby preventing the fuel tank from being subjected to an excessively high pressure when the fuel temperature is high. The evaporated fuel control apparatus shown in FIG. 1 is comprised of the fuel vapor separator 20 and the vapor cooling unit 22, and it thus is possible to provide an evaporated fuel control apparatus which has a smaller size and requires a less mounting space on the vehicle than a currently used evaporated fuel control apparatus.

Figure 4:
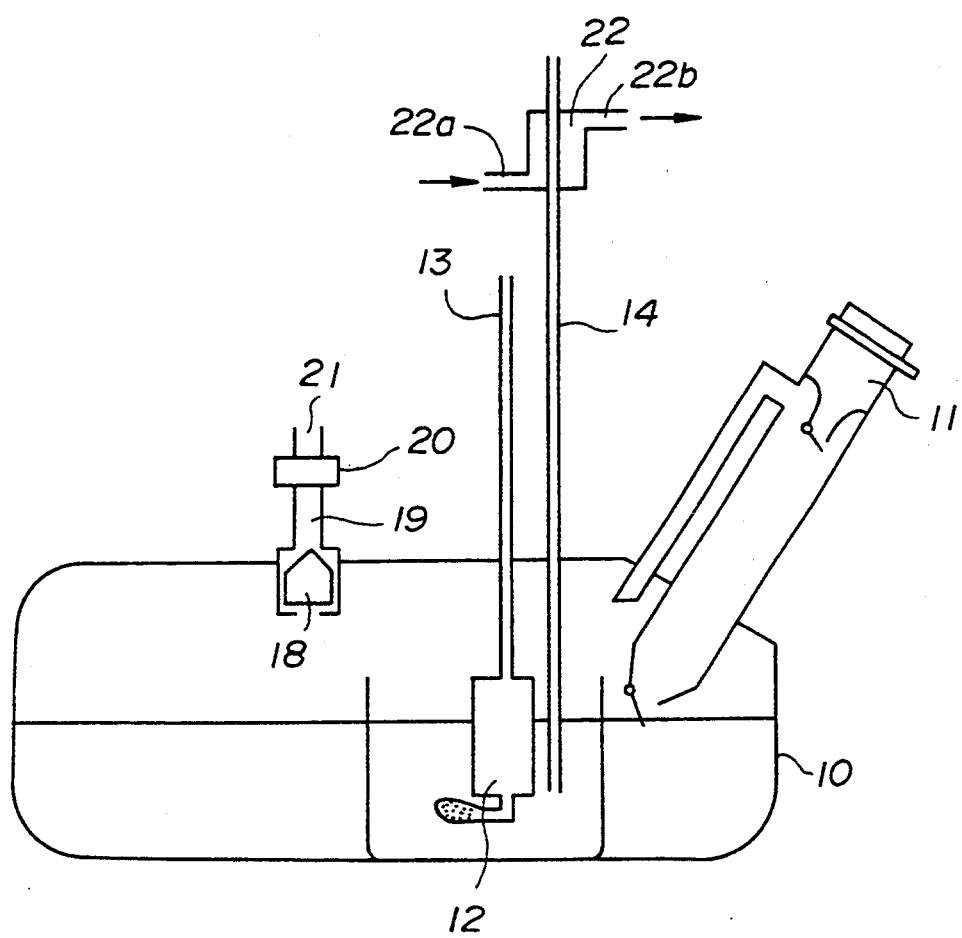
FIGS. 4 through 7 are sectional views showing various modifications of the evaporated fuel control apparatus shown in FIG. 1.

FIG. 4 shows a modification of the evaporated fuel control apparatus shown in FIG. 1. In FIG. 4, the parts which are the same as corresponding parts in FIG. 1 are designated by the same reference numerals, and a description thereof will be omitted. In the apparatus shown in FIG. 4, the vapor cooling unit 22 is mounted on the fuel return pipe 14. The fuel, heated in the vicinity of the engine, is returned to the fuel tank 10 through the fuel return pipe 14, and the fuel in the fuel return pipe 14 is cooled with external cooled air passing through the vapor cooling unit 22, thereby preventing the temperature of fuel within the fuel tank 10 from being higher than the boiling point thereof when the engine is operating.

Figure 5:
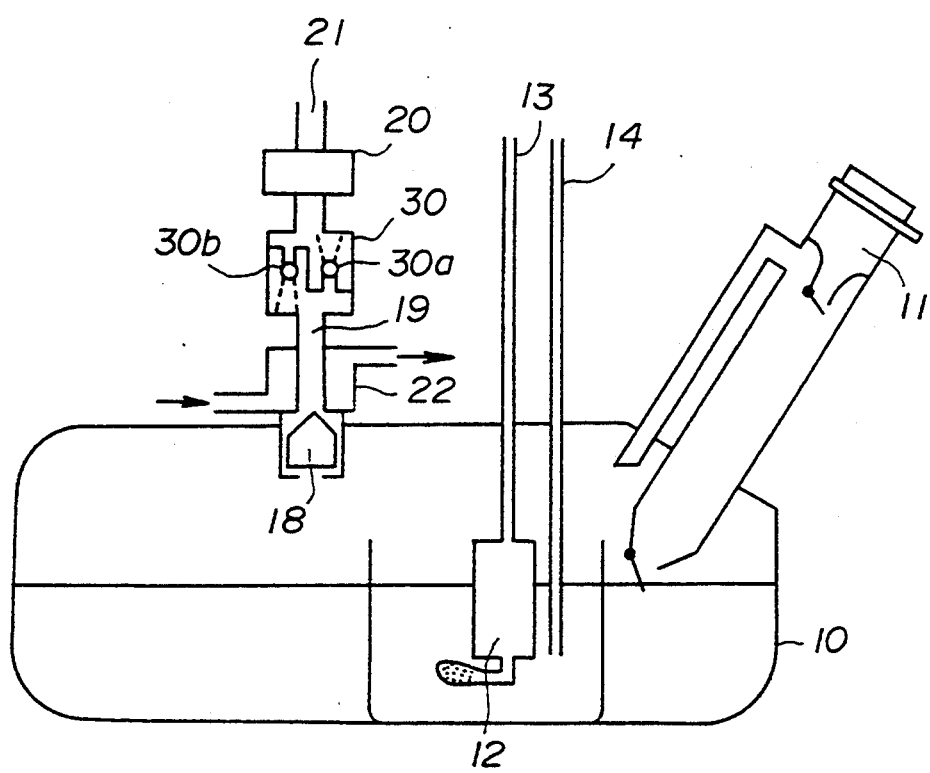

FIG. 5 shows a different modification of the evaporated fuel control apparatus shown in FIG. 1. In the apparatus in FIG. 5, a two-way check valve 30 is provided in the vapor passage 19 at an intermediate portion between the fuel vapor separator 20 and the vapor cooling unit 22. The two-way check valve 30 has a first valve 30a and a second valve 30b. The first valve 30a normally functions to close the vapor passage 19 so as to prevent the flow of fuel vapor in the direction from the fuel tank 10 to the atmosphere. The second valve 30b normally functions to close the vapor passage 19 so as to prevent the flow of fuel vapor in the direction from the atmosphere to the fuel tank 10. When the fuel tank pressure is higher than the atmospheric pressure and a difference between the fuel tank pressure and the atmospheric pressure is greater than a prescribed value, the first valve 30a is opened so that the fuel vapor is fed from the fuel tank 10 to the fuel vapor separator 20 via the two-way check valve 30. When the fuel tank pressure is lower than the atmospheric pressure and a difference between the atmospheric pressure and the fuel tank pressure is greater than a prescribed value, the second valve 30b is opened so that the fuel vapor is fed from the fuel vapor separator 20 to the fuel tank 10 via the two-way check valve 30.

In the apparatus shown in FIG. 5, the boiling point of fuel within the fuel tank 10 becomes higher due to the increased fuel tank pressure, which allows the cooling capability needed for the vapor cooling unit 22 to be lower than that needed for the vapor cooling unit shown in FIG. 1. The amount of air passing through the fuel vapor separator 20 is increased due to the two-way check valve 30, and the size of the fuel vapor separator is thus reduced.

Figure 6:
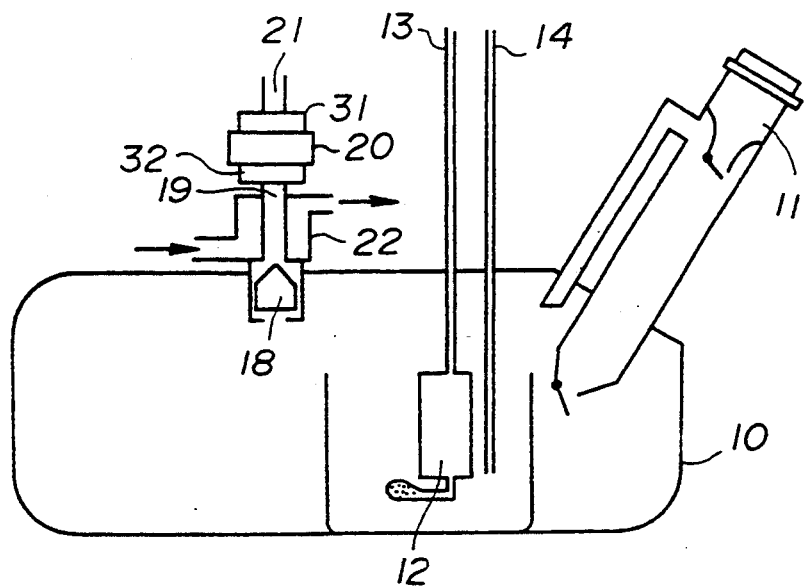

FIG. 6 shows a different modification of the evaporated fuel control apparatus shown in FIG. 1. In the apparatus shown in FIG. 6, a first filter 31 is provided in the vapor passage 19 between the opening 21 and the fuel vapor separator 20, and a second filter 32 is provided in the vapor passage 19 between the fuel vapor separator 20 and the vapor cooling unit 22. These filters serve to protect the pores of the fuel vapor separator 20 from being clogged with foreign matter contained in air fuel mixture passing through the vapor passage 19.

Figure 7:
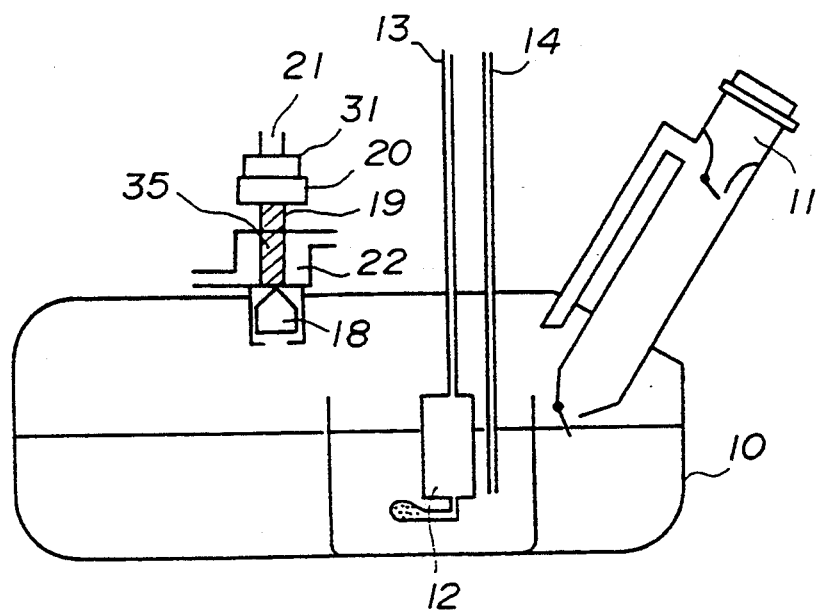

FIG. 7 shows a further modification of the evaporated fuel control apparatus shown in FIG. 1. In FIG. 7, the parts which are the same as corresponding parts in FIG. 6 are designated by the same reference numerals, and a description thereof will be omitted. In the apparatus shown in FIG. 7, instead of the second filter 32 in FIG. 6, a polymer absorbent 35 is attached to the inside peripheral wall of the vapor passage 19 where the vapor cooling unit 22 is mounted, and the polymer absorbent 35 extends from the fuel vapor separator 20 to the rollover valve 18. The polymer absorbent 35 is made of a high polymer material cross-linked with solvent molecules such as gasoline, and is capable of absorbing liquefied fuel or the like. As the polymer absorbent 35 absorbs liquefied fuel on the inside peripheral wall of the vapor passage 19 due to the cooling of the vapor cooling unit 22, it is possible to prevent the liquefied fuel from being attached to the surface of the fuel vapor separator 20. The polymer absorbent 35 also serves to prevent the pores of the fuel vapor separator 20 from being clogged with foreign matter contained in the fuel. The liquefied fuel absorbed by the polymer absorbent 35 will drop to the fuel tank 10 due to gravity.

Figure 8:
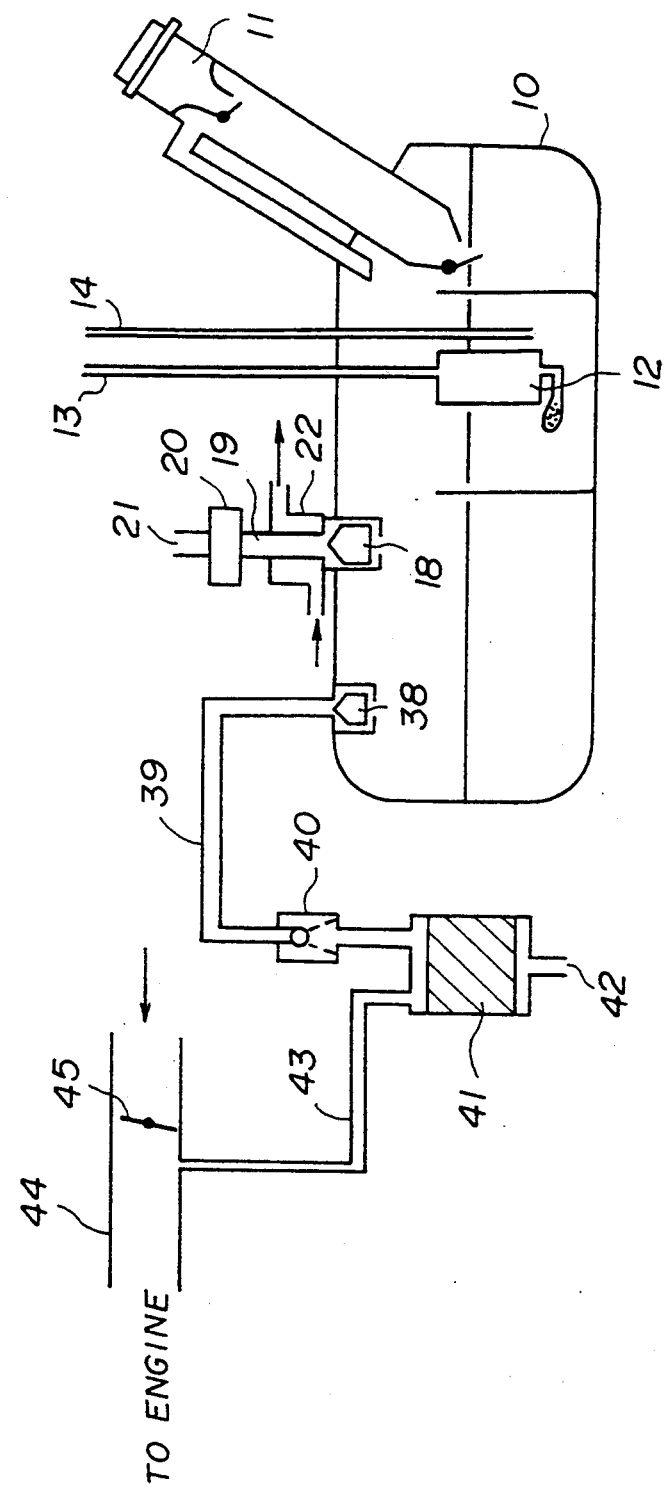
FIG. 8 is a sectional view showing a second embodiment of the evaporated fuel control apparatus according to the present invention.

Next, a description will be given of a second embodiment of the present invention with reference to FIG. 8. FIG. 8 shows an evaporated fuel control apparatus provided by the second embodiment of the present invention. In FIG. 8, the parts which are the same as the corresponding parts shown in FIG. 1 are designated by the same reference numerals, and a description thereof will be omitted.

In the apparatus shown in FIG. 8, the roll-over valve 18, the vapor passage 19, the fuel vapor separator 20 and the vapor cooling unit 22 which are the same as those shown in FIG. 1 are mounted on the fuel tank 10. In addition, a second roll-over valve 38 having a structure and function similar to the structure and function of the roll-over valve 18 is mounted at an upper portion of the fuel tank 10. A second vapor passage 39 is connected at one end to the fuel tank 10 through the second roll-over valve 38, and the second vapor passage 39 is connected at the other end to an upper portion of a canister 41 through a check valve 40. The canister 41 contains an absorbent such as active carbon for absorbing fuel vapor, and the canister 41 temporarily stores fuel vapor supplied from the fuel tank 10 via the second vapor passage 39. The check valve 40 functions to open the second vapor passage 39 when the internal pressure of the fuel tank 10 is higher than the internal pressure of the canister 41 and the difference between these pressures is greater than a prescribed value, so that the fuel vapor from the fuel tank 10 is supplied to the canister 41.

A lower portion of the canister 41 is formed with an air inlet opening 42 which is open to the atmosphere. A purge passage 43 is connected at one end to the upper portion of the canister 41, and this purge passage 43 is connected at the other end to an intake passage 44 of the internal combustion engine at a portion immediately downstream of a throttle valve 45 in the intake passage 44. When the engine is operating under a prescribed operating condition, the intake passage 44 is subjected to a negative pressure, and external air enters the canister 41 from the air inlet opening 42. The fuel vapor, temporarily stored in the canister 41, is desorbed from the absorbent of the canister 41 due to the flow of air from the canister 41 to the intake passage 44, and the fuel vapor is fed from the canister 41 into the intake passage 44 via the purge passage 43.

In the apparatus shown in FIG. 8, when the internal pressure of the fuel tank 10 is increased to an excessively high pressure due to the increase in the fuel temperature caused by any malfunction or due to the clogging of the fuel vapor separator 20, the check valve 40 is opened so that a certain amount of fuel vapor is fed from the fuel tank 10 into the canister 41 to reduce the internal pressure of the fuel tank 10. The canister 41 temporarily stores the fuel vapor supplied from the fuel tank 10 at this time, and the fuel vapor is fed from the canister 41 into the intake passage 44.

Figure 9:
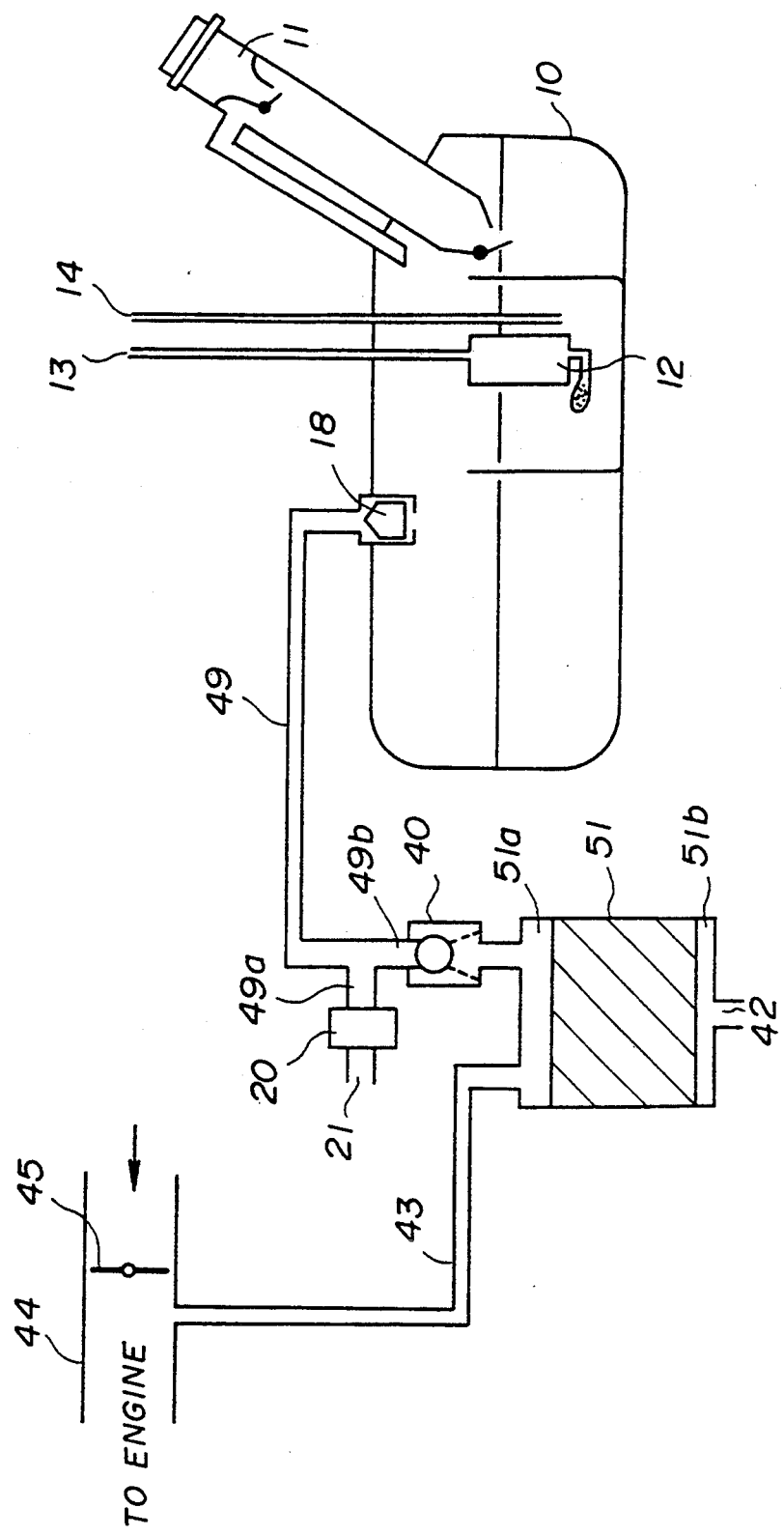
FIG. 9 is a sectional view showing a third embodiment of the evaporated fuel control apparatus according to the present invention.

Next, a description will be given of a third embodiment of the present invention with reference to FIG. 9. FIG. 9 shows an evaporated fuel control apparatus provided by the third embodiment of the present invention. In FIG. 9, the parts which are the same as corresponding parts shown in FIG. 1 are designated by the same reference numerals, and a description thereof will be omitted.

In the apparatus shown in FIG. 9, an extended vapor passage 49 is connected at one end to the fuel tank 10 through the roll-over valve 18, and the other end of the extended vapor passage 49 is formed with a first branch portion 49a and a second branch portion 49b. The fuel vapor separator 20 is provided in the middle of the first branch portion 49a, and an edge of the first branch portion 49a is formed as the opening 21 which is open to the atmosphere. The check valve 40 is provided in the middle of the second branch portion 49b, and an edge of the second branch portion 49b is connected to a canister 51.

In FIG. 9, the canister 51 contains an absorbent for absorbing fuel vapor, and the canister 51 is provided with an upper chamber 51a above the absorbent and a lower chamber 51b below the absorbent. The upper chamber 51a of the canister 51 communicates with the intake passage 44 via the purge passage 43. The lower chamber 51b of the canister 51 is formed with the air inlet opening 42 which is open to the atmosphere.

When the temperature of fuel within the fuel tank 10 is increased to the boiling point during the operation of the engine, the check valve 40 is opened so that an increasing amount of fuel vapor is fed from the fuel tank 10 into the canister 51. As the engine is operating, most of the fuel vapor supplied from the fuel tank 10 is fed into the intake passage 44 through the purge passage 43, and a smaller amount of the fuel vapor mentioned above is captured or absorbed by the canister 51.

Immediately after the engine stops operating, the temperature of fuel within the fuel tank 10 changes to a somewhat higher temperature. Thus, the internal pressure of the fuel tank 10 changes to a higher pressure due to the increased fuel temperature. As only the molecular components of air within the fuel tank 10 are exhausted to the atmosphere from the opening 21 by the fuel vapor separator 20, fuel vapor with nearly 100% concentration remains in the fuel tank 10. The check valve 40 is opened so that a somewhat greater amount of fuel vapor is absorbed or captured by the canister 51. In order to safely store all the fuel vapor supplied from the fuel tank 10, it is necessary to make the capacity of the canister 51 greater than the capacity of the canister 41 shown in FIG. 8. In the apparatus shown in FIG. 9, as the saturation pressure of fuel vapor is unlikely to be higher than the atmospheric pressure, it is unnecessary to mount the vapor cooling unit 22. Also, it is possible to safely prevent evaporated fuel of the fuel tank from escaping to the atmosphere when the fuel vapor separator 20 is clogged.

In the apparatus shown in FIG. 9, if the opening 21 is arranged within an air cleaner (not shown) in the intake passage 44 of the engine, a filter of the air cleaner can be used for protecting the pores of the fuel vapor separator 20 from being clogged with foreign matter contained in air fuel mixture passing through the vapor passage 49.

Figure 10:
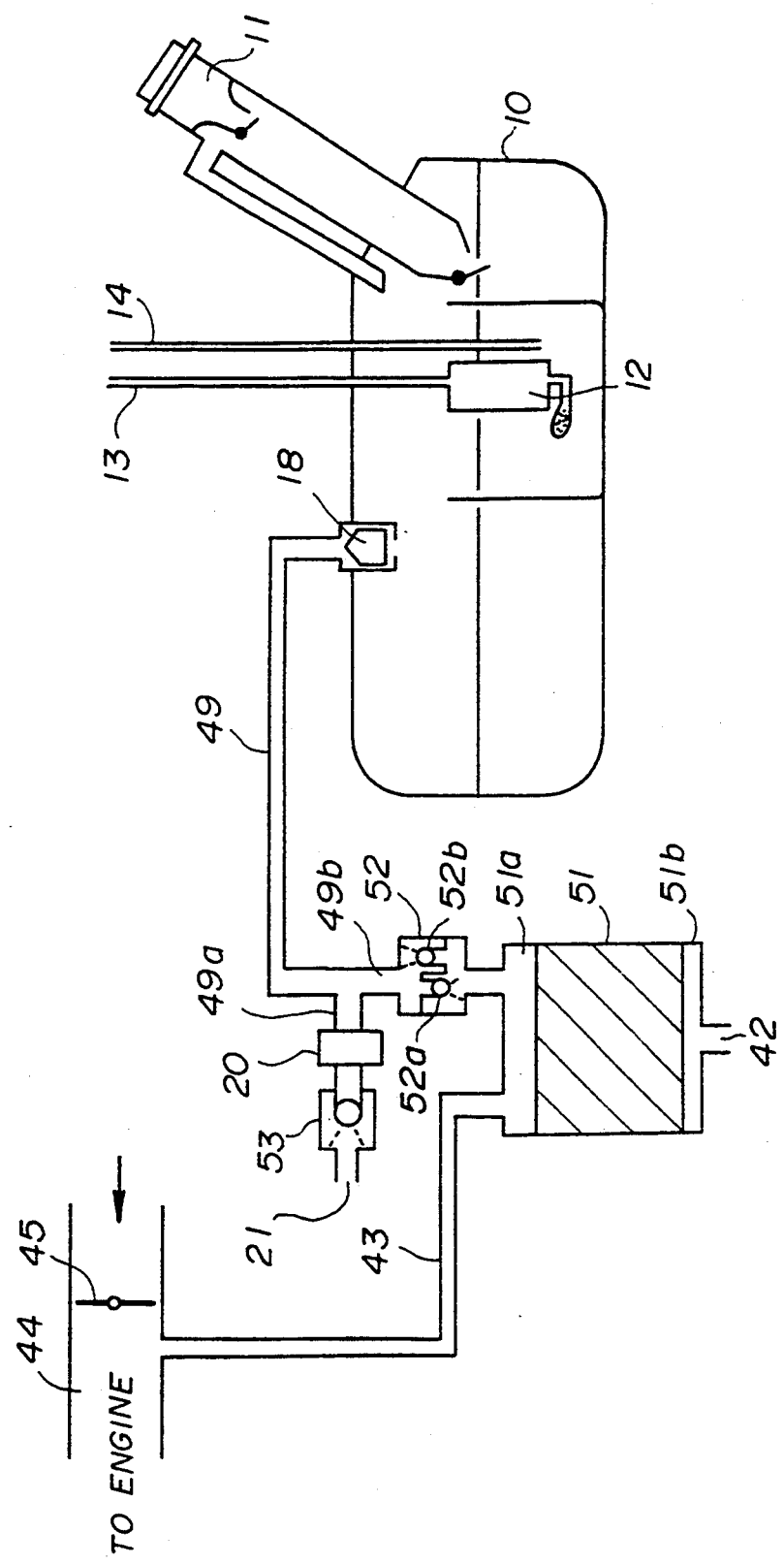
FIG. 10 is a sectional view showing a modification of the evaporated fuel control apparatus shown in FIG. 9.

FIG. 10 shows a modification of the evaporated fuel control apparatus shown in FIG. 9. In FIG. 10, a two-way check valve 52 is provided in the middle of the second branch portion 49b, instead of the check valve 40 shown in FIG. 9, and a check valve 53 is provided in the first branch portion 49a at a portion between the fuel vapor separator 20 and the opening 21. The two-way check valve 52 is provided with a first valve 52a and a second valve 52b.

When the temperature of fuel within the fuel tank 10 gradually changes to a lower temperature after the running of the vehicle at a high temperature, the internal pressure of the fuel tank 10 will be a pressure lower than the atmospheric pressure. In the apparatus shown in FIG. 10, when the internal pressure of the fuel tank 10 is lower than the atmospheric pressure, the second valve 52b of the two-way check valve 52 is opened due to the negative pressure of the fuel tank 10, so that external air enters the canister 51 from the air inlet opening 42 and is fed from the canister to the fuel tank through the valve 52b. Thus, the fuel vapor temporarily stored in the canister 51 can be returned back to the fuel tank 10 through the two-way check valve 52. In the apparatus shown in FIG. 10, it is possible to safely prevent the evaporated fuel of the fuel tank 10 from escaping to the atmosphere through the opening 42 of the canister 51.

Further, the present invention is not limited to the above described embodiments, and variations and modifications may be made without departing from the scope of the present invention.

What is claimed is:

1. An apparatus for preventing evaporated fuel of a fuel tank of an automotive vehicle including an internal combustion engine from escaping to the atmosphere, said apparatus comprising:
   a fuel tank;
   a first passage for connecting an internal space of said fuel tank to the atmosphere, said first passage having an opening which is open to the atmosphere;
   a canister for storing evaporated fuel supplied from said fuel tank through said first passage, wherein said canister has an opening which is open to said atmosphere, and wherein said first passage has an end portion connected to said canister;
   a purge passage for connecting said canister to an intake passage of the internal combustion engine so that evaporated fuel stored in said canister is fed into the intake passage through said purge passage when the intake passage is subjected to a negative pressure;
   check valve means for controlling a flow of evaporated fuel being fed from the fuel tank into the canister through said first passage, said check valve means being provided at said end portion of said first passage between the fuel tank and the canister; and
   fuel vapor separating means provided in said first passage for separating evaporated fuel of the fuel tank from air fed from the fuel tank to the atmosphere through said first passage, said fuel vapor separating means permitting passage of molecular components of air through said first passage and not permitting passage of molecular components of fuel through said first passage.

2. An apparatus according to claim 1, further comprising absorbing means for absorbing liquified fuel which is produced within the first passage between the fuel vapor separating means and the fuel tank due to cooling of evaporated fuel within the first passage.

3. An apparatus according to claim 1, further comprising cooling means for cooling evaporated fuel of the first passage with external air passing through said cooling means, said cooling means being mounted on said first passage at a portion between said fuel tank and said fuel vapor separating means.

4. An apparatus according to claim 3, further comprising absorbing means for absorbing liquified fuel which is produced within the first passage between the fuel vapor separating means and the fuel tank due to cooling of the evaporated fuel within the first passage, said cooling means being mounted on said first passage at a portion between said fuel tank and said fuel vapor separating means where said absorbing means is extensively provided within the first passage.

5. An apparatus according to claim 3, further comprising check valve means for controlling a flow of evaporated fuel being fed from the fuel tank to the atmosphere through said first passage, said check valve means being provided in the first passage between the fuel vapor separating means and the fuel tank.

6. An apparatus according to claim 1, further comprising cooling means for cooling fuel of a fuel return pipe with external air passing through said cooling means, said cooling means being mounted on said fuel return pipe, said fuel of said fuel return pipe being heated in the vicinity of an internal combustion engine and returned from the engine to the fuel tank via the fuel return pipe.

7. An apparatus for preventing evaporated fuel of a fuel tank of an automotive vehicle including an internal combustion engine from escaping to the atmosphere, said apparatus comprising:
   a fuel tank for storing fuel;

a first passage for connecting an internal space of said fuel tank to the atmosphere, said first passage having an opening which is open to the atmosphere;

a canister for storing evaporated fuel supplied from said fuel tank, said canister having an opening which is open to the atmosphere;

a second passage for connecting an internal space of the fuel tank to said canister, said second passage having an end portion connected to said canister, and said canister storing evaporated fuel supplied from the fuel tank through said second passage;

a purge passage for connecting said canister to an intake passage of the internal combustion engine so that evaporated fuel stored in said canister is fed into the intake passage through said purge passage when the intake passage is subjected to a negative pressure;

check valve means for controlling a flow of evaporated fuel being fed from the fuel tank to the canister through said second passage, said check valve means being provided at said end portion of said second passage between the fuel tank and the canister; and fuel vapor separating means provided in said first passage for separating evaporated fuel of the fuel tank from air fed from the fuel tank to the atmosphere via said fuel vapor separating means, said fuel vapor separating means permitting passage of molecular components of fuel.

* * * * *